US012239941B2

(12) United States Patent
Beh

(10) Patent No.: US 12,239,941 B2
(45) Date of Patent: Mar. 4, 2025

(54) SYSTEM FOR REDOX SHUTTLE SOLUTION MONITORING

(71) Applicant: Palo Alto Research Center Incorporated, Palo Alto, CA (US)

(72) Inventor: Eugene S. Beh, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 500 days.

(21) Appl. No.: 17/357,155

(22) Filed: Jun. 24, 2021

(65) Prior Publication Data

US 2022/0410070 A1    Dec. 29, 2022

(51) Int. Cl.

| | |
|---|---|
| *B01D 61/54* | (2006.01) |
| *B01D 53/26* | (2006.01) |
| *B01D 61/42* | (2006.01) |
| *B01D 61/46* | (2006.01) |
| *B01D 61/48* | (2006.01) |

(Continued)

(52) U.S. Cl.
CPC ........... *B01D 61/54* (2013.01); *B01D 53/263* (2013.01); *B01D 61/422* (2013.01); *B01D 61/46* (2013.01); *B01D 61/463* (2022.08); *B01D 61/48* (2013.01); *C02F 1/008* (2013.01); *C02F 1/4693* (2013.01); *C02F 1/4695* (2013.01); *F24F 3/1417* (2013.01); *C02F 2303/16* (2013.01)

(58) Field of Classification Search
CPC ..... C02F 1/4693; B01D 61/422; B01D 61/44; B01D 61/445; B01D 61/50; B01D 61/52; B01D 61/54

See application file for complete search history.

(56) References Cited

U.S. PATENT DOCUMENTS 2,672,024 A    3/1954 McGrath
4,163,716 A *  8/1979 Turnbull ................ C02F 1/463
                                          210/717

(Continued)

FOREIGN PATENT DOCUMENTS

CA    2312798 A1 *  6/1999
GB   2 520 259 A       5/2015

(Continued)

OTHER PUBLICATIONS

English translation of JP H0751682 (Year: 1995).*

(Continued)

*Primary Examiner* — Salil Jain
(74) *Attorney, Agent, or Firm* — Mueting Raasch Group

(57) ABSTRACT

An electrodialysis apparatus comprises a first reservoir wherein salt dissolved in solvent is reduced below a threshold concentration and a second reservoir wherein the salt concentration increases. A first electrode contacts a first solution of a first redox-active electrolyte material, and a second electrode contacts a second solution of a second redox-active electrolyte material. A first type of membrane is disposed between the first and second reservoirs and a second type of membrane is disposed between the first electrode and the first reservoir and between the second electrode and the second reservoir. A color measuring device is coupled to at least one of the solutions, and a control system is configured to modify the value of a property of at least one of the first and second solutions in response to detecting a color value of one of the solutions exceeding a threshold color value.

9 Claims, 5 Drawing Sheets

(51) Int. Cl.
  C02F 1/00      (2023.01)
  C02F 1/469     (2023.01)
  F24F 3/14      (2006.01)

(56)  References Cited

U.S. PATENT DOCUMENTS

| | | | |
|---|---|---|---|
| 4,593,534 | A | 6/1986 | Bloomfield |
| 4,984,434 | A | 1/1991 | Peterson et al. |
| 6,187,201 | B1 | 2/2001 | Abe et al. |
| 7,083,730 | B2 | 8/2006 | Davis |
| 7,992,855 | B2 | 8/2011 | Awano |
| 8,142,633 | B2 | 3/2012 | Batchelder et al. |
| 8,769,972 | B2 | 7/2014 | Bahar |
| 8,801,910 | B2 | 8/2014 | Bazant et al. |
| 8,999,132 | B2 | 4/2015 | Bazant et al. |
| 9,340,436 | B2 | 5/2016 | Sahu et al. |
| 9,640,826 | B2 | 5/2017 | Yan et al. |
| 9,670,077 | B2 | 6/2017 | Volkel et al. |
| 9,673,472 | B2 | 6/2017 | Volkel et al. |
| 9,905,876 | B2 | 2/2018 | Schubert et al. |
| 10,550,014 | B2 | 2/2020 | Desai et al. |
| 10,821,395 | B2 | 11/2020 | Beh |
| 10,822,254 | B2 | 11/2020 | Desai et al. |
| 2005/0183956 | A1 | 8/2005 | Katefidis |
| 2012/0138468 | A1* | 6/2012 | Sivan ................... B01D 61/445 204/644 |
| 2015/0232348 | A1 | 8/2015 | Jepson |
| 2019/0240614 | A1* | 8/2019 | Beh ...................... B01D 53/263 |
| 2020/0070094 | A1 | 3/2020 | Hussaini et al. |
| 2020/0161685 | A1 | 5/2020 | Song et al. |

FOREIGN PATENT DOCUMENTS

| | | |
|---|---|---|
| WO | 2014/181898 | 11/2014 |
| WO | 2018/032003 | 2/2018 |
| WO | 2018/119280 | 6/2018 |

OTHER PUBLICATIONS

US Dept. of Energy, "Energy Savings Potential and RD&D Opportunities for Commercial Building HVAC Systems", Dec. 2017, 172 pages.
US Dept. of Interior/US Geological Survey, Estimated Use of Water in the United States in 2010, 2014, 64 pages.
Vermaas et al., "High Efficiency in Energy Generation from Salinity Gradients with Reverse Electrodialysis", ACS Sustainable Chem. Eng., Jan. 2013, pp. 1295-1302.
Viswanathan et al., "Cost and performance model for redox flow batteries", Journal of Power Sources, vol. 247, Dec. 23, 2012, pp. 1040-1051.
Woods, "Membrane processes for heating, ventilation, and air conditioning", Renewable and Sustainable Energy Reviews, vol. 33, 2014, pp. 290-304.
Ye et al., "Performance of a mixing entropy battery alternately flushed with wastewater effluent and seawater for recovery of salinity gradient energy", Energy Environ. Sci. 2014, 7 (7), 2295-2300.
Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Huang et al., "Reversible chemical delithiation/lithiation of LifePO$_4$: towards a redox flow lithium-ion battery," Dec. 13, 2013, *Physical Chemistry Chemical Physics*, 15(6):1793-97.
International Patent Application No. PCT/US2022/072987, filed Jun. 16, 2022; International Search Report / Written Opinion issued Oct. 4, 2022; 20 pages.
"Lazard's Levelized Cost of Storage—Version 2.0." 2016, 46 pages.
Al-Jubainawi et al., "Factors governing mass transfer during membrane electrodialysis regeneration of LiCl solution for liquid desiccant dehumidification systems", Sustainable Cities and Society, vol. 28, Aug. 26, 2016.

Al-Karaghouli et al., "Energy consumption and water production cost of conventional and renewable-energy-powered desalination processes", Renewable and Sustainable Energy Reviews 2013, 24, 343-356.
Anderson et al., Capacitive deionization as an electrochemical means of saving energy and delivering clean water. Comparison to present desalination practices: Will it compete?:, Electrochimica Acta 2010, 55 (12), 3845-3856.
Arellano et al., "Effects of pH on the degradation of aqueous ferricyanide by photolysis and photocatalysis under solar radiation", Solar Energy Materials and Solar Cells 2010, 94 (2), 327-332.
Ashrae Standard, "Method of Testing for Rating Desiccant Dehumidifiers Utilizing Heat for the Regeneration Process", 2007.
Bajpayee et al., "Very low temperature membrane-free desalination by directional solvent extraction", Energy Environ. Sci. 2011, 4 (5), 1672.
Beh et al., "A Neutral pH Aqueous Organic-Organometallic Redox Flow Battery with Extremely High Capacity Retention" ACS Energy Lett, Feb. 2017, pp. 639-644.
Btmap-Vi et al., "Ordering and Customer Service Neutral pH Aqueous Redox Flow Battery Materials", Jan. 1, 2017, pp. 639.
Dai, "Increasing drought under global warming in observations and models", Nat. Clim.Change 2013, 3 (1), 52-58.
Darling et al., "Pathways to low-cost electrochemical energy storage: a comparison of aqueous and nonaqueous flow batteries", Energy Environ. Sci. 2014, 7 (11), 3459-3477.
Desai et al., "Electrochemical Desalination of Seawater and Hypersaline Brines with Coupled Electricity Storage", ACS Energy Lett. Mar. 2, 2018, pp. 375-379.
Desalination Experts Group, "Desalination in the GCC", 2014, 47 pages.
Dipaola, "Saudi Arabia Gets Cheapest Bids for Solar Power in Auction" Bloomberg, Jan. 16, 2018, 3 pages.
Gong et al., "A zinc-iron redox-flow battery under $100 per kWh of system capital cost", Energy & Environmental Science, 2015. 5 pages.
Gong et al., All-Soluble All-Iron Aqueous Redox-Flow Battery, ACS Energy Letters, Jan. 2016, pp. 89-93.
Gowin, "Examining the economics of seawater desalination using the DEEP code", Nuclear Power Technology Development Section, I. A. E. A., Ed. Vienna, Austria, 2000.
Gu et al., "A multiple ion-exchange membrane design for redox flow batteries", Energy Environ. Sci. 2014, 7 (9), 2986.
Hilbert et al., "Correlations between the Kinetics of Electrolytic Dissolution and Deposition of Iron: I . The Anodic Dissolution of Iron", Journal of The Electrochemical Society 1971, 118 (12), 1919-1926.
Howell et al., "Overview of the DOE VTO Advanced Battery R&D Program", Jun. 6, 2016 24 pages.
Hu et al., "Long-Cycling Aqueous Organic Redox Flow Battery (AORFB) toward Sustainable and Safe Energy Storage", Journal of the American Chemical Society 2017, 139 (3), 1207-1214.
John et al., "Seasonal cycles of temperature, salinity and water masses of the western Arabian gulf", Oceanol. Acta 1990, 13 (3), 273-281.
Khawaji et al., "Advances in seawater desalination technologies", Desalination 2008, 221 (1-3), 47-69.
Kozubal et al., "Low-Flow Liquid Desiccant Air-Conditioning: Demonstrated Performance and Cost Implications" NREL Technical Report, Sep. 2014, 104 pages.
La Mantia et al., "Batteries for efficient energy extraction from a water salinity difference", Nano Lett. 2011, 11 (4), 1810-3.
Lee et al., "Desalination of a thermal power plant wastewater by membrane capacitive deionization", Desalination 196, 2006, pp. 125-134.
Lee et al., "Rocking chair desalination battery based on Prussian blue electrodes", ACS Omega 2017, 2 (4), 1653-1659.
Li et al., "Photovoltaic-electrodialysis regeneration method for liquid desiccant cooling system", Solar Energy, vol. 83, 2009, pp. 2195-2204.
Logan et al., "Membrane-based processes for sustainable power generation using water", Nature 2012, 488, 313.

(56) References Cited

OTHER PUBLICATIONS

Loutatidou, et al., "Capital cost estimation of RO plants: GCC countries versus southern Europe", Desalination 2014, 347, 103-111.
Malhotra et al., "Use cases for stationary battery technologies: A review of the literature and existing projects", Renewable and Sustainable Energy Reviews 56, 2016, pp. 705-721.
McGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Nair et al., "Water desalination and challenges: The Middle East perspective: a review", Desalin. Water Treat. 2013, 51 (10-12), 2030-2040.
Oren, "Capacitive deionization (CDI) for desalination and water treatment—past, present and future (a review)", Desalination 2008, 228 (1-3), 10-29.
Pasta et al., "A desalination battery" Nano Lett.2012, 12 (2), 839-43.
Patil et al., "Diffusivity of some zinc and cobalt salts in water", J. Chem. Eng. Data 1993, 38 (4), 574-576.
Sadrzadeh et al., "Sea water desalination using electrodialysis", Desalination 2008, 221 (1), 440-447.
Schaetzle et al., "Salinity Gradient Energy: Current State and New Trends", Engineering, vol. 1, Issue 2, Jun. 2016, pp. 164-166.
Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.
Scialdone et al., "Investigation of electrode material—Redox couple systems for reverse electrodialysis processes. Part I: Iron redox couples", Journal of Electroanalytical Chemistry 2012, 681 (Supplement C), 66-75.
Stillwell et al., "Predicting the specific energy consumption of reverse osmosis desalination", Water 2016, 8 (12).
Urban, "Emerging Scientific and Engineering Opportunities within the Water-Energy Nexus", Joule, Dec. 20, 2017, pp. 665-688.

\* cited by examiner

SYSTEM FOR REDOX SHUTTLE SOLUTION MONITORING

TECHNICAL FIELD

This disclosure relates generally to systems for monitoring and/or modifying the status of a redox shuttle solution in a redox flow electrochemical salt separation device and methods of operating the same.

BACKGROUND

While necessary for comfort, and in parts of the world survival, air conditioning and dehumidification have a significant negative impact on the environment. Currently, air conditioning systems produce heat that measurably increases urban temperatures, and they have the potential to discharge unsafe chemicals, such as greenhouse gases, to the atmosphere. To do this, they also consume vast amounts of energy, primarily electricity. With the climate's ever-increasing temperatures, the demand for air conditioning systems will continue to increase such that energy demand from dehumidification and air conditioning systems is expected to triple in the next thirty years.

Using liquid desiccant regenerators in an air conditioning system can reduce energy consumption as compared with vapor compression-based air conditioning systems. Certain liquid desiccant-based systems couple one or more liquid desiccant regenerators employing a redox shuttle with one or more air contactors to treat air supplied to an enclosed space such as a building. Due to the regenerating of the liquid desiccant, the systems can maintain operation for significant lifetimes. However, over time exposure to components such as gases or other pollutants in the air to be treated, results in absorption of the components causing the redox shuttle to equilibrate with those components. When these components are acidic/basic (e.g., carbon dioxide ($CO_2$) in air is an acidic gas) or oxidizing/reducing, the equilibration can alter properties of the redox shuttle. Described herein are systems for monitoring and/or modifying properties of a redox shuttle solution to maintain the properties in predetermined ranges.

SUMMARY

Embodiments described herein are directed to an electrodialysis apparatus. The apparatus comprises a first reservoir comprising an input and an output, wherein salt dissolved in solvent in the first reservoir is reduced below a threshold concentration during an operation mode and a second reservoir comprising an input and an output, wherein the salt dissolved in the solvent in the second reservoir increases in concentration during the operation mode. A first electrode is in contact with a first solution of a first redox-active electrolyte material having at least one property having a first value and configured to have a reversible redox reaction with the first redox-active electrolyte material and accept at least one ion from the solvent in the first reservoir. A second electrode is in contact with a second solution of a second redox-active electrolyte material having at least one property having a second value and configured to have a reversible redox reaction with the second redox-active electrolyte material and drive at least one ion into the solvent in the second reservoir. The apparatus also comprises a first type of membrane disposed between the first and second reservoirs and a second type of membrane, different from the first type, disposed between the first electrode and the first reservoir and disposed between the second electrode and the second reservoir. A color measuring device is coupled to at least one of the first solution and the second solution and a control system is configured to modify the value of the at least one property of the first solution or the second solution in response to the color measuring device detecting a color value of the first solution or the second solution exceeding a threshold color value.

Other embodiments are directed to a system. The system includes an optical sensor configured to detect a color of a redox shuttle solution, a power supply configured to apply pulses of direct current, and a controller coupled to the optical sensor and the power supply. The controller receives a signal from the optical sensor indicating the color of the redox shuttle solution and in response to the color exceeding a threshold color directs the power supply to apply current pulses to the redox shuttle solution.

Further embodiments are directed to a method. The method includes detecting a color of a redox shuttle solution in a redox flow electrochemical salt separation system having two electrodes. One electrode is in contact with a first redox shuttle solution containing reservoir and the other electrode is in contact with a second redox shuttle solution containing reservoir. When the color exceeds a color threshold, a voltage is applied to at least one of the electrodes to modify a property of the redox shuttle solution. In response to applying the voltage, whether the color of the redox shuttle solution exceeds the color threshold is detected, and if the color exceeds the threshold, a second voltage is applied until the color no longer exceeds the color threshold.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

Figure 1:
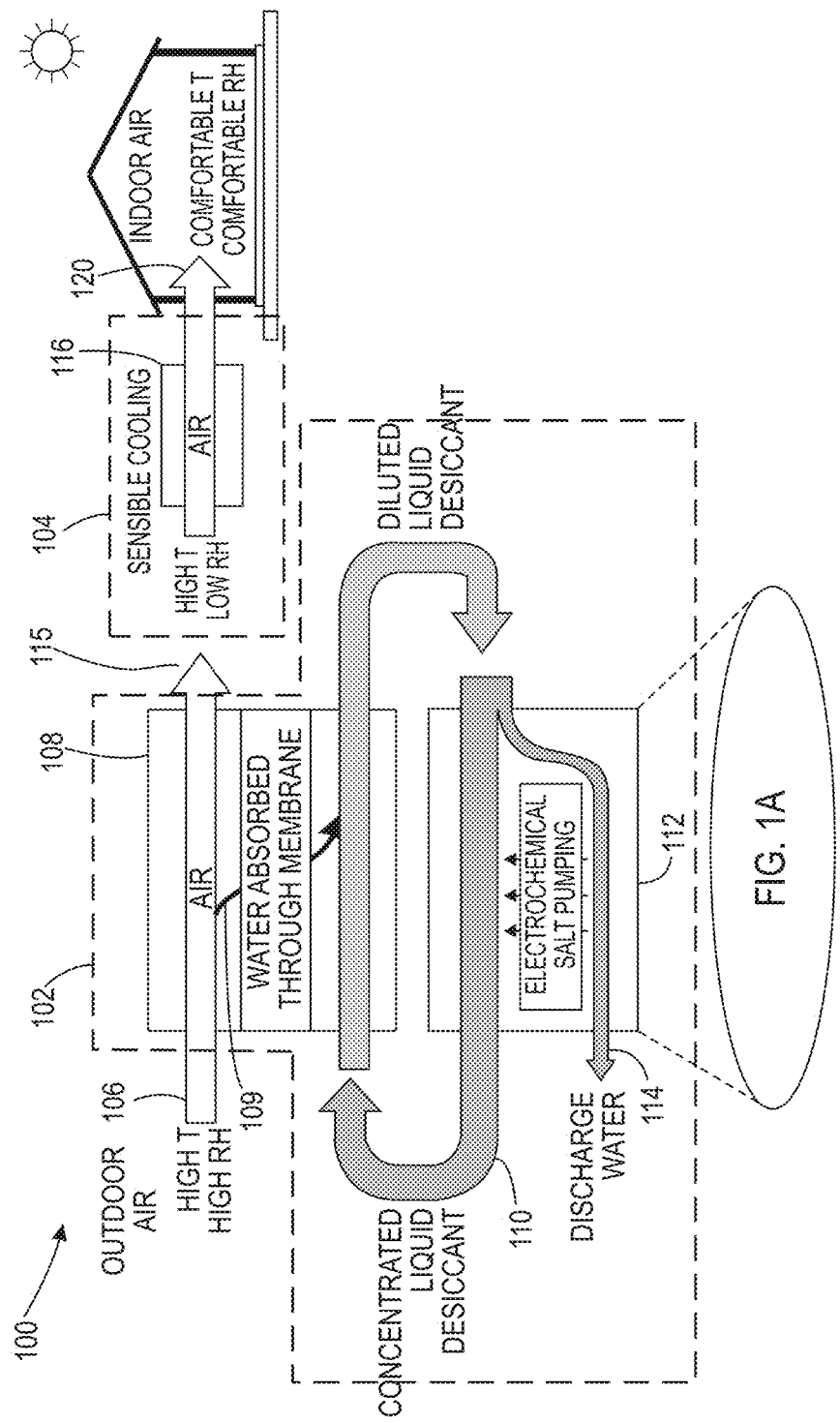
FIG. 1 is a diagram of a redox flow electrochemical salt separation system incorporated in a dehumidification system in accordance with certain embodiments.

The present disclosure relates to redox flow electrochemical salt separation systems. In certain embodiments, a redox flow electrochemical salt separation system may be part of a dehumidification system as a liquid desiccant system used in, among other things, heating, ventilation, and air-conditioning (HVAC). As described herein, a redox-assisted dehumidification system utilizes a liquid desiccant (commonly an aqueous solution of an inorganic salt such as lithium chloride) that is fed through an air contactor where it absorbs humidity from input humid air and becomes diluted, or weakened. The weak desiccant is then fed into an electrochemical regenerator (e.g., cell or stack) that uses a redox shuttle to move salt from one liquid stream to another. In other embodiments, the redox flow electrochemical salt separation systems may be used in dewatering applications.

When this redox-shuttled salt separation process is used to regenerate liquid desiccant brines (e.g., in a dehumidification system) or in dewatering applications, gases or pollutants from the input humid air or environment slowly accumulate in the redox shuttle solution. For example, when carbon dioxide from input air accumulates in the redox shuttle, the redox shuttle reaches an equilibrium with the acidic carbon dioxide in the air, thereby lowering the pH of the redox shuttle. However, increasing the acidity of certain redox shuttles can cause those redox shuttles to decompose and the decomposition can release toxic gases and/or components. In certain embodiments where the redox shuttle is ferrocyanide/ferricyanide (herein abbreviated as "Fe(CN)"), equilibrating the Fe(CN) with carbon dioxide lowers the redox shuttle to a pH less than 7 (e.g., about 5.5 or 6.0) which causes slow decomposition of the Fe(CN) and releases toxic hydrogen cyanide gas into the dehumidification system and/or environment.

Alternatively, or in addition, side reactions at the electrodes of the redox flow electrochemical salt separation apparatus can occur. In an ideal system, all the charge that is transferred to the redox shuttle solution at the cathode is extracted from the same redox shuttle solution at the anode. At high voltages (e.g., above the water splitting potential of 1.23 V), hydrogen evolution can occur at the cathode and oxygen evolution can occur at the anode. When hydrogen and/or oxygen evolution occurs, the amount of redox shuttle that is reduced at the cathode may not exactly match the amount of redox shuttle that is oxidized at the anode. Over a period of time, this imbalance causes a drift in the state of charge (SOC) of the redox shuttle. The higher the voltage, the shorter the amount of time it takes for a noticeable drift. For example, at a voltage of 1.3 V, it may take months to detect a change in SOC.

The SOC is defined as the molar percentage of the redox shuttle that is in the oxidized state, as opposed to the reduced state. Taking Fe(CN) as an example, a solution that contains purely ferrocyanide as the redox-active species can be said to be at 0% SOC. A solution containing purely ferricyanide is at 100% SOC. Thus, a solution with a 9:1 molar ratio of ferrocyanide:ferricyanide is at 10% SOC, and so on. A drift in SOC is undesirable because the SOC will eventually either reach 0% SOC or 100% SOC, such that there would be insufficient redox shuttle in the appropriate redox state proximate to at least one of the electrodes to sustain a high current density. Because the hydrogen and oxygen evolution reactions are proton-coupled, they also change the pH of the shuttle solution, which can cause decomposition of the redox shuttle or degradation of materials wetted by the shuttle solution. For example, 1,1'-bis((3-trimethylammonio)propyl)ferrocene ([BTMAP-Fc]$^{2+}$) and 1,1'-bis((3-trimethylammonio)propyl)ferrocenium ([BTMAP-Fc]$^{3+}$), another redox shuttle, are known to be unstable in solutions above pH of about 9. When hydrogen evolution taking place at the cathode reaches a threshold, the pH of the redox shuttle solution may rise sufficiently high that the redox shuttle decomposes.

Detecting a shift in pH or SOC allows for mitigation or correction of the shuttle parameter before damage to the liquid desiccant system or redox shuttle occurs. The systems described herein monitor and maintain the redox shuttle properties of pH and/or SOC in the liquid desiccant regenerator to prolong the safe operation of the redox-assisted dehumidification system.

Operation of the redox-assisted dehumidification system is described in further detail in connection with FIGS. 1 and 1A. FIG. 1 illustrates a diagram of an electrodialytic liquid desiccant air conditioning (ELDAC) system 100 as described above in accordance with certain embodiments. The system 100 includes a desiccant section 102 and a cooling section 104. In the desiccant section 102, outdoor air 106 (and/or recirculated air) is forced across an air contactor 108 such as an air-liquid interface, or a liquid-liquid interface such as a liquid-carrying membrane dryer. In certain embodiments, the air 106 may be outside air of high temperature and high relative humidity (RH). Water 109 from the air 106 is absorbed at the air contactor 108 into a concentrated liquid desiccant 110, e.g., an aqueous salt solution, is then passed through a redox-assisted electrochemical regenerator 112 to separate dilute stream 114 (e.g., discharge water) and re-concentrate the desiccant stream 110. Example salts that may be used for the desiccant include, for example, LiCl, NaCl, LiBr, and CaCl$_2$).

The humidity (i.e., water content by percent mass of the humid air) is reduced in the air 115 leaving the desiccant section 102, wherein it is cooled by the cooling section 104. This cooling section 104 may include an evaporator 116 and other components not shown (e.g., condenser, compressor). Because the air 115 entering the cooling section 104 has lower relative humidity compared to the outside/recirculated air 106, the evaporator 116 is more efficient and can reduce the temperature of the cooled air 120 by a greater amount than if the evaporator 116 had to also condense moisture from the incoming air 115.

Figure 1A:
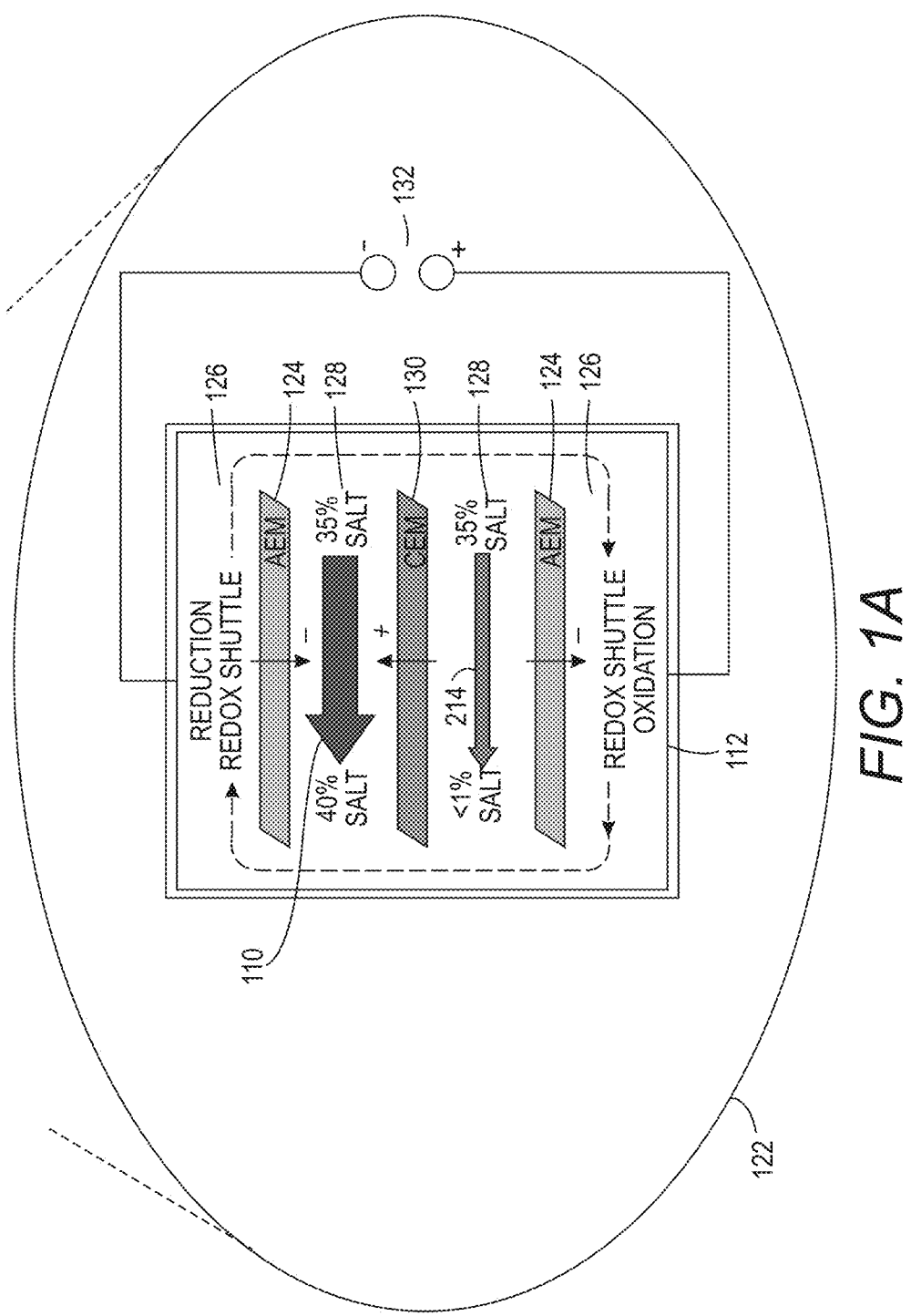
FIG. 1A is a diagram of a redox flow electrochemical salt separation system in accordance with certain embodiments.

As seen in the detail view 122 of FIG. 1A, redox-assisted regenerator 112 has two outer ion exchange membranes 124 that separate the outer redox channels 126 from the inner concentrate 110 and dilute 114 streams. In this example the outer ion exchange membranes 124 are configured as anion exchange membranes (AEM). The concentrate 110 and dilute 114 streams are separated by a central ion exchange membrane 130, which in this example is a cation exchange membrane (CEM). In other configurations, the central ion exchange membrane 130 may be an AEM and the outer membranes 124 may be CEMs. An efficient membrane pair of one CEM and one AEM in the redox-assisted regenerator 112 has a Coulombic efficiency above 70%.

The four (or more) chambered desalination cell may use either one redox-active species that is circulated around the anode and cathode, where it undergoes faradaic reactions at both electrodes, or two redox-active species that are each confined to the anode or cathode respectively. An external voltage 132 induces oxidation or reduction in redox-active shuttle molecules, driving ion movement across the membranes 124, 130 without splitting water or producing other gaseous byproducts (e.g. chlorine) and creating at least two streams: re-concentrated desiccant 110 and discharge water 114. The percentages of salt concentrations shown in FIG. 1A are examples only—both inlets do not need to have the same concentration and the output concentrations may have a range of differences in concentrations. The separated concentrations can also be achieved over multiple stages. One proposed redox shuttle is a positively charged ferrocene derivative such as [BTMAP-Fc]$^{2+}$/[BTMAP-Fc]$^{3+}$, which is non-toxic, is highly stable, and has very rapid electrochemical kinetics and negligible membrane permeability. Other redox shuttle solutions may include ferrocyanide/ferricyanide ($[Fe(CN)_6]^{4-}/[Fe(CN)_6]^{3-}$) or a negatively charged ferrocene derivative. The moving parts of the system may include low pressure pumps for liquid circulation and fans for air circulation. Additional details of this type of four-channel, electrodialytic, stack with redox shuttle assist can be found in commonly-owned U.S. Pat. No. 10,821,395, which is hereby incorporated by reference in its entirety.

Figure 2:
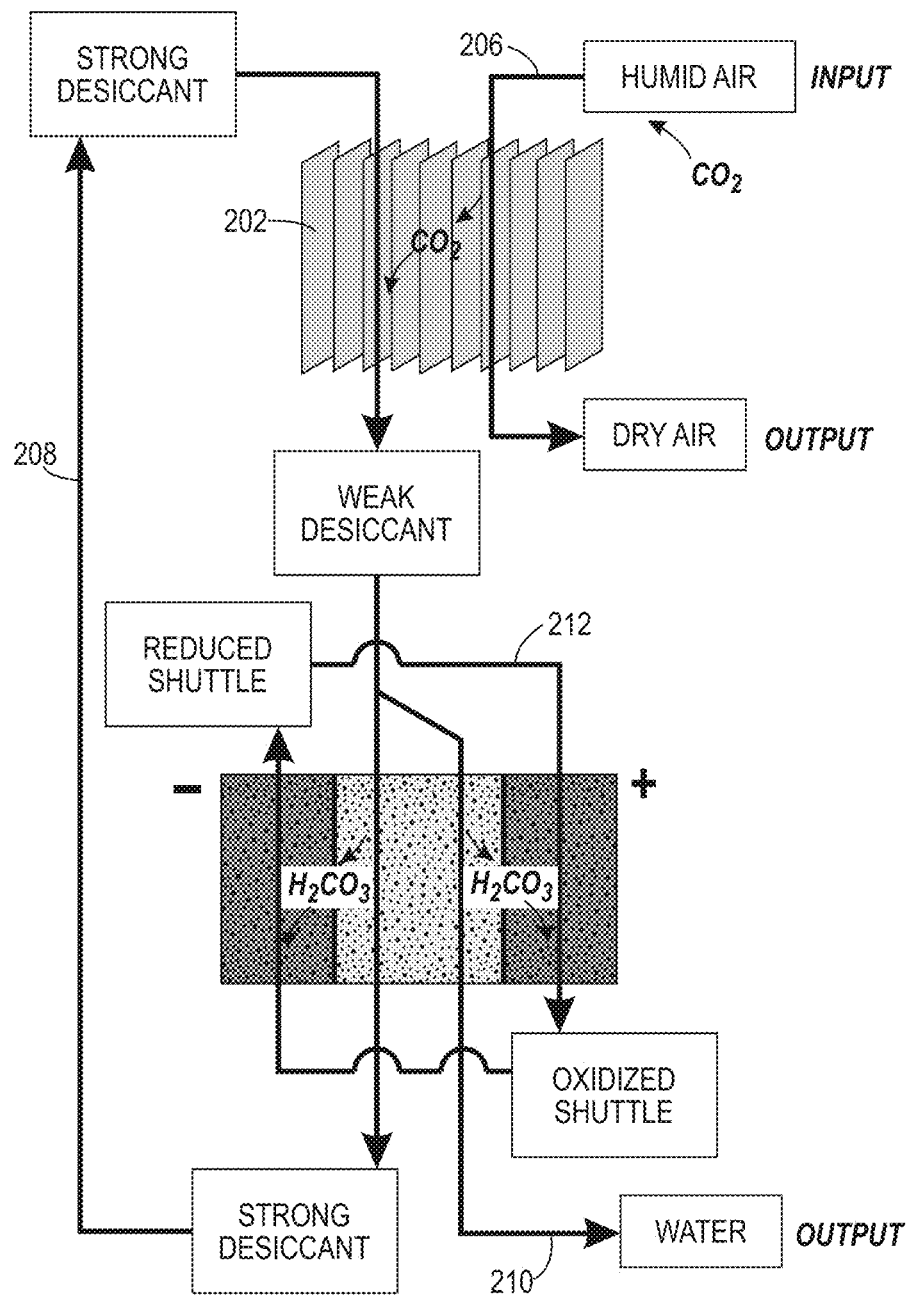
FIG. 2 is a schematic diagram of fluid flow in a redox flow electrochemical salt separation system in accordance with certain embodiments.

FIG. 2 illustrates how gases and/or pollutants enter and equilibrate with the redox shuttle solution(s). Using carbon dioxide gas as an example, the carbon dioxide is present in the (e.g., humid) air 206 input to the air contactor 202. Along with the water transferred to the liquid desiccant stream 208, carbon dioxide gas is also absorbed by the liquid desiccant stream 208. The carbon dioxide reacts with the water to form carbonic acid. When the liquid desiccant stream 208 enters the electrochemical regenerator 204, carbonic acid transfers across the membranes of the electrochemical cell from both the salinated 208 and desalinated 210 streams. The carbonic acid mixes with the one or two redox shuttle solutions 212 and over time accumulates thereby increasing the acidity and lowering the pH of the shuttle(s).

If left unchecked, the redox shuttle(s) will eventually equilibrate with the carbon dioxide in the input air at a pH lower than an initial pH. For example, distilled water that is in equilibrium with ambient air has a pH in the range of 5.5-6.0 due to the acidic dissolved carbon dioxide. In addition to gases such as carbon dioxide, other electrochemical side products from hydrogen and/or oxygen evolution reactions at the electrodes, or volatile compounds present in the input air, may also accumulate in the redox shuttle causing the pH to change. The changing pH may also be accompanied by a change in the SOC of the redox shuttle. In other embodiments, gases and/or pollutants may raise the redox shuttle pH increasing the alkalinity of the shuttle(s). Redox-active molecules present as vapors in air, including, but not limited to, hydrogen sulfide, sulfur dioxide, formaldehyde, and formic acid, may also dissolve in the redox shuttle solution and affect the SOC and pH. However, when the pH of certain redox shuttles exceed (as used herein, exceed means to go above or below) a threshold pH, the redox shuttles can decompose thereby shortening the lifespan of the regeneration system. In certain embodiments where Fe(CN) is used as the redox shuttle, lowering the pH below 7 causes a slow decomposition of Fe(CN) along with a release of toxic hydrogen cyanide gas. In other embodiments where $[BTMAP-Fc]^{2+}/[BTMAP-Fc]^{3+}$ is the shuttle, raising the pH above 9 causes a slow decomposition of the redox shuttle to form insoluble iron hydroxides or oxides.

When some redox shuttle solutions change pH levels, the solutions also change color. For example, when the pH of Fe(CN) is lowered below pH 7, the shuttle solution slowly turns intense blue-green. The blue-green color of the decomposing Fe(CN) is clearly visible to a casual observer. However, if detected in time the original yellow color of the Fe(CN) solution can be restored by bringing the pH back up above pH 7. These color changes are used to monitor and adjust the pH level of the redox shuttle(s) in the electrochemical regenerator. A similar principle holds for the SOC of the redox shuttle solution. For example, [BTMAP-Fc]' is orange-brown in color while $[BTMAP-Fc]^{3+}$ is an intense blue-green, and mixtures of the two have absorbances in the UV-visible region (i.e. colors) that are additive. A shift in SOC can therefore be detected by measuring the relative absorbances of the two oxidation states of the shuttle.

A monitoring system is coupled to the electrochemical regenerator to measure the color value of the redox shuttle solution(s). When the color value exceeds a threshold value, a pH balance adjustment procedure and/or an SOC adjustment procedure is triggered to restore the shuttle solution to a predefined pH or SOC value, or range, to avoid or delay decomposition of the shuttle solution(s). In certain embodiments, the color value of the redox shuttle(s) is detected using a color measurement device such as a spectrophotometer or a colorimeter, which in certain embodiments is equipped with an optional color filter for increased sensitivity, in order to accurately and precisely detect the color, and thereby any color change, in the shuttle solution(s). The color measuring device uses an illumination source to direct light through one or more filters and then through the sample (e.g., redox shuttle solution) to be received by a sensor such as a photocell detector. The sensor is coupled with a processor and/or display to determine the color value. When the color value exceeds a predetermined threshold, the processor also triggers a pH or SOC adjustment process.

In certain embodiments, the color measurement device detects the color of an Fe(CN) redox shuttle. If the color of the shuttle has a blue-green component indicating that the pH is lower than 7, the predetermined threshold where the shuttle solution begins to decompose, the processor initiates a de-acidification sequence. In other embodiments, the detected color indicates whether the SOC has drifted too low or too high, and when the SOC has exceeded a threshold (or moved out of a predetermined range) the processor initiates an oxidation or a reduction sequence, respectively. The pH and/or SOC monitoring and adjustment system may be separate, or integrated with, the electrochemical regenerator.

In other embodiments, the color measurement device detects the color of a $[BTMAP-Fc]^{2+}/[BTMAP-Fc]^{3+}$ redox shuttle. If the color(s) indicate that the pH is higher than 9, the predetermined threshold where the shuttle solution begins to decompose, the processor initiates an acidification sequence. Alternatively, if the colors detected indicate that the SOC has drifted beyond a lower or an upper threshold, the processor initiates an oxidation or a reduction sequence, respectively. The pH and/or SOC monitoring and adjustment system may likewise be separate, or integrated with each other and/or the electrochemical regenerator.

Figure 3:
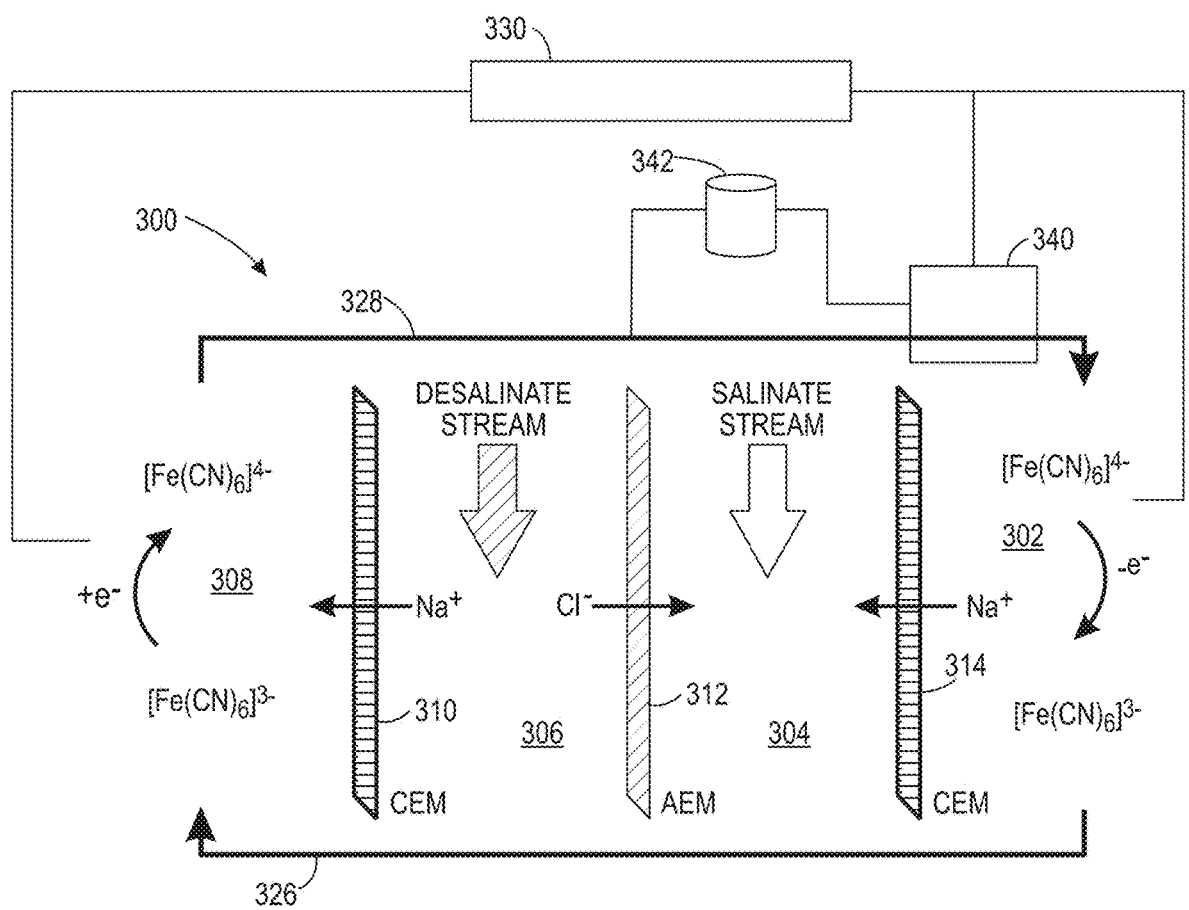
FIG. 3 is a schematic diagram of a redox flow electrochemical salt separation system coupled with a monitoring system in accordance with certain embodiments.

A monitoring system integrated with an electrochemical liquid desiccant regeneration system 300, which is used in a dehumidification system utilizing an air contactor as discussed above is shown in FIG. 3. The electrochemical regeneration system 300 is shown as a single cell having four chambers 302, 304, 306, 308 in series. Each chamber is separated from its neighbor by an appropriate membrane 310, 312, 314. The two central chambers 304, 306 contain a salinate stream and a desalinate stream, and the two outer chambers 302, 308 respectively contain the anode and the cathode, respectively. The membranes may be ion-selective membranes such as cation exchange membranes or anion exchange membranes depending upon the cell design. If the redox shuttles have a high enough molecular weight (e.g., are dendrimeric or polymeric in nature), the membranes may be microporous membranes. The membranes may also incorporate some ion-selective elements and some microporous elements within the same membrane. In certain embodiments, the membranes may also be composite membranes.

A redox shuttle (e.g., ferrocyanide/ferricyanide (Fe(CN))) is transferred from the cathode 308 to the anode 302 as indicated by arrow 328 and from the anode 302 to the cathode 308 by arrow 326. The anode chamber 302 and the salinate chamber 304 are separated by a cation exchange membrane 314, and the cathode chamber 308 and the desalinate chamber 306 are also separated by a cation exchange membrane 310. However, membranes 310 and 314 may not necessarily comprise the same material or be of similar dimensions. The salinate chamber 304 is also separated from the desalinate chamber 306 by an anion exchange membrane 312. As can be seen, chloride and sodium ions cross membranes 312 and 314 to enter the salinate stream in chamber 304 while they cross membranes 310 and 312 to leave the desalinate stream in chamber 306.

In various embodiments, an arbitrary number of pairs of alternating salinate and desalinate chambers can be employed. However, water splitting may start to occur at a high number of chambers once the applied voltage exceeds 1.23 V. The voltage is applied by energy source 330, which is coupled to both the cathode 308 and anode 302 chambers. The energy source 330 is also coupled to the pH and/or SOC monitoring system 340, and in certain embodiments, coupled to the color measuring device of the pH and/or SOC monitoring system. In alternative embodiments, the pH and/or SOC monitoring system is coupled to a separate, dedicated energy source. Energy source 330 may be any one or combination of sources including a battery, a solar panel or array, a wind turbine, a potentiostat, a generator, wall power, etc. The energy source 330 may also include power electronics to convert the incoming power into a form that is usable by the electrochemical regeneration system 300, for example, by converting alternating current into direct current or vice versa, by increasing or decreasing the voltage. While the monitoring system 340 is illustrated as sampling the shuttle as it is transferred from the cathode 308 to the anode 302, the monitoring system 340 may evaluate the shuttle at any point in the shuttle circulation system. The monitoring system may be configured to take multiple measurements of a single sample or measure the shuttle at a plurality of locations as the shuttle circulates between the anode 302 and the cathode 308. Although the monitoring system 340 is shown as taking a direct measurement of the shuttle as it is transferred to the anode 302, in various embodiments, a portion of the shuttle is diverted to the color measurement device. As mentioned above, in certain embodiments, the color measuring device can be located external to the electrochemical regenerator, or it may be integrated with the regenerator. The pH and/or SOC monitoring system can sample the redox shuttle solution continuously, intermittently, or at a set frequency.

When the color measuring device determines that the redox shuttle solution color has exceeded the predetermined threshold, the pH and/or SOC adjustment procedure is initiated. In certain embodiments, the pH is adjusted by introducing measured amounts of pH corrective material to the redox shuttle solution. For example, when the redox shuttle is Fe(CN) and the pH needs to be raised back above a pH of 7, measured amounts of caustic material such as an aqueous solution of lithium hydroxide, or powdered lithium hydroxide, may be introduced to the shuttle solution. In other embodiments, if the SOC of the redox shuttle needs to be raised, hydrogen peroxide solution, chlorine gas, or some other oxidant may be introduced to the shuttle solution. Similarly, if the SOC of the redox shuttle needs to be lowered, hydrazine hydrate, lithium metal, zinc metal, sodium dithionite, or some such reducing agent may be introduced to the shuttle solution. In certain embodiments, both the pH and the SOC may be corrected based on the color measurement results. The pH and/or SOC corrective material may be stored 342 proximate the regeneration system and introduced into the shuttle upstream to the color measuring device to provide quick feedback about the pH and/or SOC adjustment. However, the storage 342 may be configured to introduce the corrective material at any point in the shuttle circulation system. The pH and/or SOC monitoring system controller determines the amount of pH and/or SOC corrective material to introduce to the redox shuttle solution based on the measured color level. If, after adding the pH and/or SOC corrective material, the color level still exceeds the threshold, additional corrective material is added to the shuttle solution until the color level is measured below the predefined threshold.

In alternative embodiments, the pH and/or SOC of the shuttle solution is adjusted electrochemically. In such embodiments, the pH and/or SOC corrective material 342 may not be included in the system. The application of a predetermined amount of charge at a specific potential to the cathode 308 and anode 302. (e.g., a pulse of high potential) can increase a shuttle solution's pH due to the reaction kinetics of the shuttle solution, relative to other reactions at the electrodes.

Even in the absence of any electrocatalysts (e.g., carbon electrodes commonly used in a liquid desiccant regeneration system), the hydrogen evolution reaction is kinetically faster than the oxygen evolution reaction:

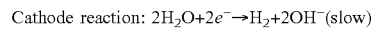

Cathode reaction: $2H_2O+2e^-\rightarrow H_2+2OH^-$ (slow)

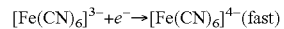

$[Fe(CN)_6]^{3-}+e^-\rightarrow[Fe(CN)_6]^{4-}$ (fast)

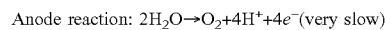

Anode reaction: $2H_2O\rightarrow O_2+4H^++4e^-$ (very slow)

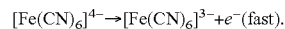

$[Fe(CN)_6]^{4-}\rightarrow[Fe(CN)_6]^{3-}+e^-$ (fast).

This imbalance in reaction rates can be exploited to adjust the pH and/or the SOC of the shuttle solution without needing to add any external reagents. At low voltages, the partial current density for hydrogen or oxygen evolution is negligible, but the partial current density becomes more significant at very high potentials, e.g. 10 volts. At a particular potential above the water splitting potential, which is determined empirically for a particular system, the hydrogen evolution reaction will have significantly higher partial current density than the oxygen evolution reaction. The effects of chloride oxidation to chlorine gas at the anode are mitigated by the presence of the redox shuttle (e.g., Fe(CN)), because the two will react very quickly:

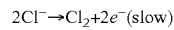

$2Cl^-\rightarrow Cl_2+2e^-$ (slow)

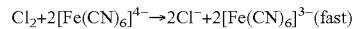

$Cl_2+2[Fe(CN)_6]^{4-}\rightarrow 2Cl^-+2[Fe(CN)_6]^{3-}$ (fast)

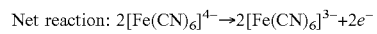

Net reaction: $2[Fe(CN)_6]^{4-}\rightarrow 2[Fe(CN)_6]^{3-}+2e^-$

By applying a pulse of high potential (e.g., in a range of 1.23-10 volts, and in certain embodiments from 2-5 volts) to the cathode 308 and anode 302 of the regeneration system, the net effect is to increase the pH of the shuttle solution while increasing the proportion of ferricyanide vs. ferrocyanide.

In other embodiments, the SOC (and/or pH) of the redox shuttle is adjusted electrochemically in either direction (i.e., up or down) by draining the redox shuttle solution from a first electrode, circulating all remaining redox shuttle around the second electrode, and circulating water (with an optional acidic, alkaline, or neutral supporting electrolyte) around the first electrode. The application of a predetermined amount of charge at a specific potential to the cathode 308 and anode 302 (e.g., a pulse of high potential as set forth above) can increase or decrease the pH and/or SOC of the shuttle solution, as explained below using a Fe(CN) shuttle as an example. After the application of the pulse of high potential, the first electrode is drained of water and the original shuttle solution is replaced and recirculated around both the first and second electrodes again, as before.

Example 1: Water at Cathode, Fe(CN) Shuttle at Anode

Cathode reaction: $2H_2O + 2e^- \rightarrow H_2 + 2OH^-$

Anode reaction: $[Fe(CN)_6]^{4-} \rightarrow [Fe(CN)_6]^{3-} + e^-$

The net result is an increase in the SOC of the shuttle. Because the water at the cathode 308 does not appreciably mix with the shuttle solution at the anode 302, pH change to the shuttle is minimal. In certain embodiments, the high pH water produced at the cathode may be mixed in with the shuttle solution to raise the shuttle pH.

Example 2: Fe(CN) Shuttle at Cathode, Water at Anode

Cathode reaction: $[Fe(CN)_6]^{3-} + e^- \rightarrow [Fe(CN)_6]^{4-}$

Anode reaction: $2H_2O \rightarrow O_2 + 4H^+ + 4e^-$

The net result is a decrease in the SOC of the shuttle. Because the water at the anode does not appreciably mix with the shuttle solution at the cathode, pH change to the shuttle is minimal. However, in certain embodiments, the low pH water produced at the anode may be mixed in with the shuttle solution to lower the shuttle pH.

Figure 4:
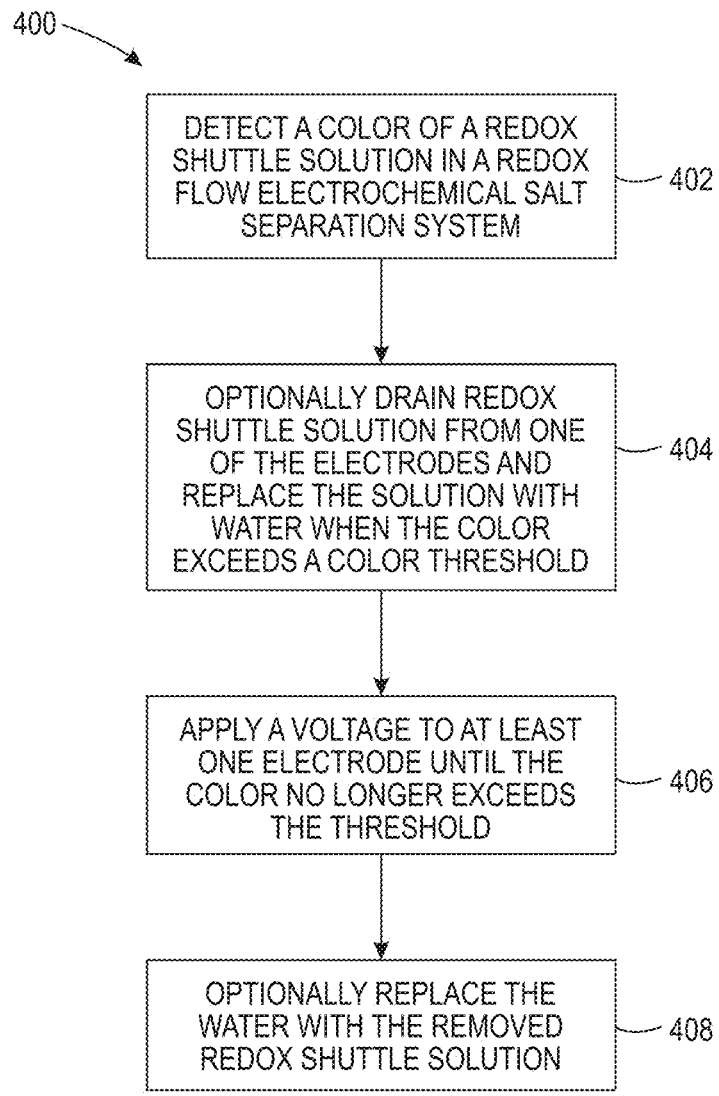
FIG. 4 is a flow diagram of a method in accordance with certain embodiments.

Methods for modifying the pH and/or SOC of a redox shuttle solution in a redox flow electrochemical salt separation system are further illustrated in the flow diagram of FIG. 4. The method includes detecting a color of a redox shuttle solution in a redox flow electrochemical salt separation system having two electrodes 402. One electrode is in contact with a first redox shuttle solution containing reservoir and the other electrode is in contact with a second redox shuttle solution containing reservoir. When the color exceeds a color threshold, in certain embodiments the redox shuttle is optionally removed from the first reservoir and replaced with water 404. The water may include various component including a supporting electrolyte. A voltage is applied to at least one electrode to modify the pH and/or SOC as a result of the reaction kinetics discussed above 406. The applied voltage may be in a range of 1.23-10 volts. In response to applying the voltage, the color of the redox shuttle solution is detected to determine whether it exceeds the color threshold, and if the color exceeds the threshold a second voltage is applied until the color no longer exceeds the color threshold. If water was supplied to the first reservoir, the water is removed from the first reservoir and the water is replaced in the first reservoir with the removed redox shuttle solution 408. In certain embodiments, the redox shuttle solution color is detected, analyzed, and a property is modified without replacing any of the redox shuttle solution.

Eventually, the redox shuttle solution may need to be replaced or reconditioned. However, monitoring and adjusting the pH and/or SOC of the redox shuttle solution(s) as described herein can mitigate or avoid decomposition of the shuttle solution(s) and any accompanying dangerous release of toxic byproducts, or can also identify when such mitigations are no longer effective.

As set forth above, various embodiments directed to monitoring and adjusting the pH and/or SOC of a redox shuttle solution can be incorporated into a redox flow electrochemical salt separation system. Without the monitoring and adjustment systems, the redox shuttle will equilibrate with contaminants from air input to a dehumidification system incorporating the redox flow electrochemical salt separation system, which will cause the shuttle solution to decompose. The processes and systems described herein can detect and reverse conditions within the shuttle solution that suggest decomposition and/or the release of dangerous or contaminating components, which will prolong the lifetime of the equipment and increase the safety of those in the proximity.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An electrodialysis apparatus, comprising:
a first reservoir comprising an input and an output, wherein concentration of salt dissolved in solvent in the first reservoir is reduced below a threshold concentration during an operation mode;
a second reservoir comprising an input and an output, wherein concentration of salt dissolved in the solvent in the second reservoir increases in concentration during the operation mode;
a first electrode in contact with a first solution of a first redox-active electrolyte material having at least one property having a first value, wherein the first electrode is configured to have a reversible redox reaction with the first redox-active electrolyte material;
a second electrode in contact with a second solution of a second redox-active electrolyte material having at least one property having a second value, wherein the second electrode is configured to have a reversible redox reaction with the second redox-active electrolyte material;
a first type of membrane disposed between the first and second reservoirs;
a second type of membrane, different from the first type, disposed between the first electrode and the first reservoir and disposed between the second electrode and the second reservoir;
a color measuring device coupled to at least one of the first solution and the second solution for detecting a color value of the first solution or the second solution; and
a control system configured to modify the value of the at least one property of the first solution or the second solution in response to the color measuring device detecting a color value of the first solution or the second solution exceeding a threshold color value, wherein the at least one property of the first solution or the second solution is state of charge (SOC).

2. The electrodialysis apparatus of claim 1, further comprising an electrical energy source coupled to the first and second electrodes and the control system is coupled to the electrical energy source and configured to control the energy source to apply a pulse at a predetermined potential between the first and second electrodes in response to the color measuring device detecting a color value of the first solution or the second solution exceeding a threshold color value to modify the at least one property.

3. The electrodialysis apparatus of claim 1, wherein at least one of the first solution and the second solution is one or both of ferrocyanide and ferricyanide.

4. The electrodialysis apparatus of claim 1, wherein at least one of the first solution and the second solution is $[BTMAP-Fc]^{2+/3+}$.

5. The electrodialysis apparatus of claim 1, wherein the color measuring device is a colorimeter.

6. The electrodialysis apparatus of claim 1, wherein the color measuring device is a spectrophotometer.

7. The electrodialysis apparatus of claim 1, wherein the threshold color value indicates a pH below 7.

8. The electrodialysis apparatus of claim 1, wherein the threshold color value indicates a pH above 9.

9. The electrodialysis apparatus of claim 1, wherein the first solution and the second solution form a single redox shuttle cycled between the first and second electrodes.

* * * * *